United States Patent [19]

Kim

[11] Patent Number: 4,975,104
[45] Date of Patent: Dec. 4, 1990

[54] METHOD OF FORMING BARRIER RIB GAS DISCHARGE DISPLAY PANEL

[75] Inventor: Dae-Il Kim, Suwon, Rep. of Korea

[73] Assignee: Samsung Electron Devices Co., Ltd., Kyonggi-do, Rep. of Korea

[21] Appl. No.: 404,668

[22] Filed: Sep. 8, 1989

[30] Foreign Application Priority Data

Jun. 2, 1989 [KR] Rep. of Korea ............... 89-7635

[51] Int. Cl.$^5$ ............................................ C03L 17/34
[52] U.S. Cl. .......................................... 65/18.1; 65/23;
65/60.2; 427/376.2; 427/286; 427/226; 427/126.3
[58] Field of Search ............... 65/18.1, 18.3, 23, 60.2, 65/60.4, 60.5, 60.53; 427/126.3, 376.2, 286, 226

[56] References Cited

U.S. PATENT DOCUMENTS

| | | | |
|---|---|---|---|
| 3,976,907 | 8/1976 | Yanagisawa | 313/582 |
| 4,020,191 | 4/1977 | Nagashiro | 427/12 |
| 4,206,386 | 6/1980 | Akutsu | 315/169.4 |
| 4,296,146 | 10/1981 | Penn | 427/226 |
| 4,325,002 | 4/1982 | Kobale | 313/485 |
| 4,459,323 | 7/1984 | Gravleau et al. | 427/226 |
| 4,888,210 | 12/1989 | Isozaki et al. | 427/226 |

FOREIGN PATENT DOCUMENTS 57-32035 9/1983 Japan .

Primary Examiner—David L. Lacey
Assistant Examiner—John J. Bruckner
Attorney, Agent, or Firm—Mathews, Woodbridge & Collins

[57] ABSTRACT

A method for forming barrier ribs for a gas discharge display panel which includes the steps of: covering a glass substrate with a conductive ITO film; covering the conductive film with photoresist; exposing the photoresist to radiation; developing the photoresist so as to selectively remove portions of photoresist thereby creating apertures in the photoresist; etching the panel conductive ITO film so as to remove the conductive film in the apertures; depositing barrier rib material including glass particles in the apertures formed in the photoresist until such time as the barrier rib material exceeds the thickness of the photoresist material; and, heating the foregoing combination to a temperature of approximately 580° C. for about 10 minutes to burn off substantially all photoresist material and solidify the barrier material so as to form glass barrier ribs. The glass barrier ribs formed have a shape at least partially defined by the photoresist that was burned off.

6 Claims, 2 Drawing Sheets

FIG. 1
(PRIOR ART)
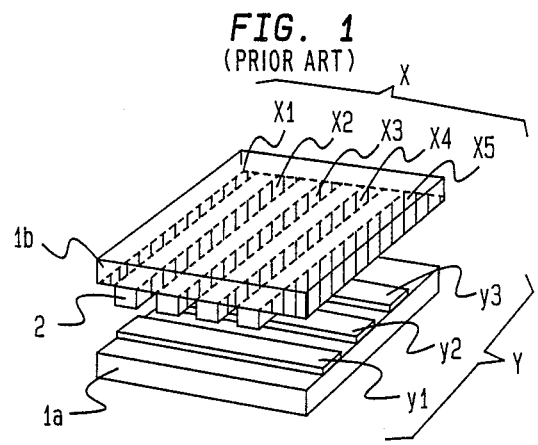
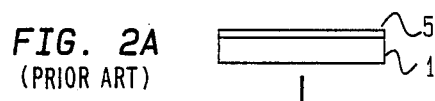
FIG. 2A
(PRIOR ART)
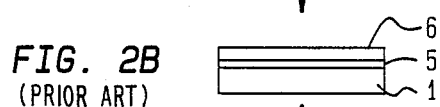
FIG. 2B
(PRIOR ART)
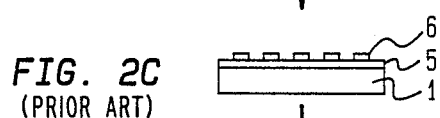
FIG. 2C
(PRIOR ART)
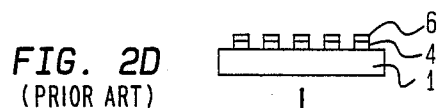
FIG. 2D
(PRIOR ART)
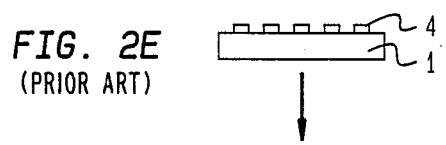
FIG. 2E
(PRIOR ART)
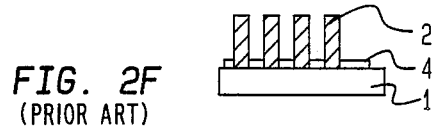
FIG. 2F
(PRIOR ART)

FIG. 3
(PRIOR ART)
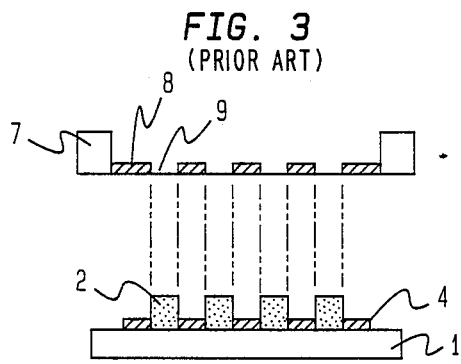
FIG. 4A
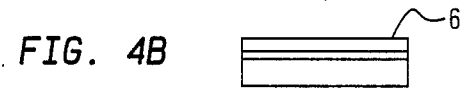
FIG. 4B
FIG. 4C
FIG. 4D
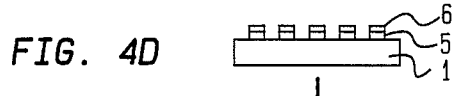
FIG. 4E
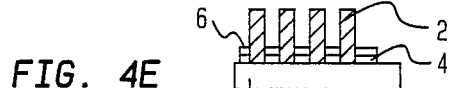
FIG. 4F
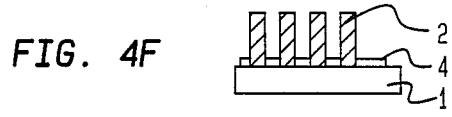

METHOD OF FORMING BARRIER RIB GAS DISCHARGE DISPLAY PANEL

BACKGROUND OF THE INVENTION

The present invention relates to a barrier rib forming method for a gas discharge display panel utilizing a gas discharge, and more particularly, to a barrier rib forming method for a gas discharge display panel which is made to form the barrier rib in a state wherein a photoresistor remains on the surface of an anode upon manufacturing a matrix type gas discharge display panel.

In general, a gas discharge display panel is a displaying element in which an inert gas is introduced and sealed between the upper and lower separate electrodes formed respectively on each surface of two glass substrates, and wherein displaying numerals, letters and the like is accomplished by utilizing the gas discharge produced upon applying a voltage at the electrodes having a structure that, as shown in FIG. 1, includes a cathode group Y composed of electrodes $y_1$-$y_n$ with predetermined distance intervals therebetween formed on the surface of a glass substrate $1a$ located at the rear side as viewed in the displaying direction, and an anode group X composed of electrodes $x_1$-$x_n$ with predetermined distance intervals therebetween formed on the glass substrate $1b$ located at the front side, and barrier ribs 2 made from glass paste formed between the anodes $x_1$-$x_n$ within a structure that said two glass substrates $1a$ and $1b$ confronting one another.

The gas discharge display panel having such structure as aforementioned is usually provided with the operational potentials in sequential time sharing to each electrode $y_1$-$y_n$ of the cathode group Y, while the operational potentials corresponding to the display signals are applied sequentially or simultaneously to each electrode $x_1$-$x_n$ of the anode group X of the opposite side, so that a display picture can be obtained in line sequence or point sequence by discharging between each electrode $x_1$-$x_n$, $y_1$-$y_n$ in response to the magnitude of the potential difference corresponding to the display signals.

At this moment, in order to restrain the diffusion of plasma glow generated at the cathode, the barrier ribs are usually formed by printing on the glass substrate formed with the anode or the glass substrate formed with the cathode.

Japanese laid open patent application Sho-58-150248, which is a prior art of the gas discharge display panel having such electrode structure, describes that the insulation barrier ribs are of a predetermined height for the prevention of the plasma glow (becoming the factor of error during display) generated at the cathode and are formed by the screen printing method so as to direct from the surface of a substrate provided with the anode group X toward the cathode group Y.

The conventional barrier rib forming method according to the above-described usual screen printing method will be described in detail with reference to the process sequence diagrams shown in FIG. 2 as follows.

Here, the forming of the barrier ribs is a process of forming the electrode, in which at first ITO(Indium Thin Oxide) film 5 is coated on the surface of the glass substrate 1 in order to form the anode, and photoresist 6 is coated on said ITO film 5 by using a spin coater or the like and then being dried, and thereafter the photoresist 6 is exposed by utilizing a photo mask of predetermined pattern and being developed.

And thereafter, when it is processed by ITO etching solution, the non-hardened portion of the photoresist 6 and the portion of the ITO film 5 corresponding thereto are removed. Accordingly only the photoresist 6 of the hardened portion and the portion of the ITO film 5 corresponding thereto remain on the glass substrate 1.

When the glass substrate 1 in such condition is processed with a photoresist removing solution, the remaining photoresistor is removed and accordingly only the anode 4 remains on the surface of the glass substrate 1.

The above-described process is illustrated in the sequence shown from FIG. 2(A) to 2(E).

When a glass paste is printed successively from 7 to 10 times and dried in the spaces between the anodes 4 after removal with the photoresist 6 according to aforementioned process, the barrier ribs 2 are formed as shown in FIG. 2(F).

As described above, according to the conventional screen printing method for forming the barrier ribs, the glass paste is printed between the anodes 4 that have been formed with a predetermined pattern on the glass substrate 1. However, at this moment, since the glass is printed after removing the photoresist 6 remaining on the surface of said anode 4, owing to the discordance of the anode 4 located on the glass substrate 1 and the openings 9 of the printing mask 8 fixed at the mask frame 7, various problems arise as described below.

That is to say, in those cases when the barrier ribs are formed by using the conventional barrier rib forming method, and since the anode 4 formed on the surface of the glass substrate 1 is coated with a transparent ITO film, there has been a problem wherein it is hard to correctly print the glass paste by aligning the barrier rib forming portion between the anode 4 with said openings 9 of the printing mask 8.

That is, when the glass substrate 1, formed with the ITO pattern, and the printing mask 8 are positioned with one another and when viewing the glass substrate 1 through the openings 9 of the printing mask 8, and since the ITO film is transparent, it is difficult to discriminate that the opening 9 and the ITO pattern on the surface of the glass substrate are overlapped with error.

Therefore, when the glass paste is printed in a state that the openings 9 and the ITO pattern are overlapped with some error, since the glass paste is printed on a part of the surface of the ITO pattern, the area of the anode is reduced. Accordingly, the discharging property of the display element becomes deteriorated.

Further, in those cases when the glass paste is printed with the thickness of several $\mu$m on the slippery glass substrate, a phenomenon wherein the glass paste spreads laterally has arisen. Spreading on the glass substrate between the anodes occurs with a ITO of the thickness of several thousand A. Accordingly, the essential area of the anode becomes decreased, and consequently the deterioration of the discharging characteristic and the luminance occurs.

OBJECT AND SUMMARY OF THE INVENTION

Therefore, it is an object of the present invention to provide a barrier rib forming method in which the discharging characteristic of the display element is improved by making it without printing glass on the surface of the ITO pattern when forming the barrier ribs of the gas discharge display panel.

In order to accomplish the above object, according to the present invention, in a manufacturing method of a gas discharge display panel including the electrode forming process and the barrier rib forming process, a barrier rib forming method is provided in which the glass paste is printed repeatedly several times while the photoresist remains on the ITO pattern. The photoresist remains as it is after etching the photoresistor during the barrier rib forming process.

The foregoing and other objects as well as advantages of the present invention will become clear by the following description of the invention with reference to the accompanying drawings.

BRIEF DESCRIPTION OF THE DRAWINGS

For a better understanding of the invention, and to show how the same may be carried into effect, reference will now be made, by way of example, with respect to the accompanying drawings, in which:

FIG. 1 is a schematic perspective view illustrating the structure of general direct current type gas discharge display panel.

FIGS. 2(A) to 2(F) are process sequence diagrams of the barrier rib forming process of a conventional gas discharge display panel.

FIG. 3 is a schematic sectional view illustrating the forming method of a conventional barrier rib using a mask frame.

FIGS. 4(A) to 4(F) are process sequence diagrams of the barrier rib forming process of a gas discharge display panel in accordance with a preferred embodiment of the present invention.

Throughout the drawings, like reference numerals and symbols are used for designating like or equivalent parts of portions, for simplicity of illustration and explanation.

DETAILED DESCRIPTION OF THE PREFERRED EMBODIMENT

Hereinafter a preferred embodiment of the present invention will be described in detail with reference to the accompanying drawings.

FIGS. 4(A) to 4(F) are process sequence diagrams of the barrier rib of a gas discharge display panel of a preferred embodiment of the present invention, the same designations are used for the same numerals or symbols throughout.

At first, the electrode manufacturing process for forming the anode with ITO film is known technique, in which the ITO film 5 is coated on the entire surface of the glass substrate 1. The photoresist 6 is then coated on the surface of the ITO film 5. The photoresist 6 is dried and then exposed with a predetermined pattern by using a photo mask and it is then developed. When it is put into the ITO etching solution, the ITO film and the photoresist are removed by etching.

These processes are referenced by the process sequence shown from FIGS. 4(A) to 4(D).

During the above process, in the process of coating the photoresist 6 on the surface of ITO film 5, the coating thickness of a normal photoresist is formed more than 1 μm, usually at least 3 μm in thickness, so that the diffusing phenomenon of the glass paste in the barrier rib forming process can be prevented.

Thus, the space intervals of the ITO pattern and the openings 9 of the printing mask 8 are aligned. Then, the barrier rib is formed by a printing and drying process which includes repeatedly printing a glass paste several times as shown in FIG. 4(E).

In this preferred embodiment of the present invention, since the sum of the thickness of the ITO pattern and the thickness of the photoresist 6 formed on said ITO pattern is similar to the thickness of the glass plate printed when one time while forming the barrier rib, the glass paste can not intrude the region of the ITO pattern.

The glass substrate 1, formed with the barrier ribs in accordance with the process sequence shown in the drawings from FIGS. 4(A) to 4(E), is then fired in a furnace at a temperature of about 580° C. for 10 minutes. The photoresist 6 is burned out as shown in FIG. 4(F).

At this moment, the organic solution among the glass particles and the organic solution which has been forming the glass paste are volatilized, and the glass particles are formed with mutual sintering while the particles are being solidified.

That is, while the anodes 4 of the ITO pattern are formed on the glass substrate 1, the barrier ribs are formed with predetermined height between each anode 4.

Thus, the feature of the present invention is the process for printing the glass paste on the glass substrate by utilizing a printing mask 8 fixed in a mask frame 7 such that the photoresist 6 coated on the ITO film 5 is formed with a predetermined pattern.

Since the photoresist 6, coated on the ITO film 5, has a rather red color when viewing said glass substrate 1 through the openings 9 of the printing mask 8, the discrimination of the ITO pattern with the photoresist 6 of a red color becomes clear. Accordingly, it is easily discriminated whether or not there is overlapping in error of the openings 9 and the photoresist 6.

As described above, according to the present invention, in those cases when the barrier ribs are formed between the transparent ITO patterns, and since the glass paste can be coated on the glass substrate so as not to be overlapped on the ITO pattern because the arrangement of the mask for printing and the ITO pattern are easy, the discharging area is extended according to the area of the anode being broadened, and the high luminance and the stable discharge characteristic can be obtained in the gas discharge display panel manufactured as this.

In addition, since the photoresist 6 remaining on the ITO patterns after the ITO etching process is removed during the firing process, the usual process of removing the photoresist 6 by putting it into the photoresist 6 exfoliation solution is not required. Therefore, there is an advantage in that the process is shortened.

It will be appreciated that the present invention is not restricted to the particular embodiment that has been described hereinbefore, and that variations and modifications may be made therein without departing from the spirit and scope of the invention as defined in the appended claims and equivalents thereof.

What is claimed is:

1. A method for forming barrier ribs for a gas discharge display panel comprising the steps of:
   a. covering a glass substrate with a conductive film;
   b. then covering said conductive film with photoresist;
   c. then exposing said photoresist to radiation;
   d. then developing said photoresist so as to selectively remove portions of photoresist thereby creating apertures in said photoresist;

e. then etching the conductive film so as to remove the conductive film in said apertures;

f. then forming the panel by depositing barrier rib material including glass particles in said apertures formed in said photoresist until such time as the barrier rib material at least exceeds the thickness of said photoresist; and, g. then heating the panel to a temperature sufficient to burn off substantially all photoresist portions remaining from step d and solidify said barrier material so as to form glass barrier ribs, wherein said glass barrier ribs have a shape at least partially defined by said photoresist that was burned off.

2. The method of claim 1 further comprising the steps of:

h. repeating step f. until said deposit of barrier rib material substantially exceeds the thickness of said photoresist.

3. The method of claim 2 wherein when said photoresist is deposited on said conductive film, it is deposited to a thickness of at least 1 $\mu$m.

4. The method of claim 3 wherein the thickness of said photoresist is deposited to at least 3 $\mu$m.

5. The method of claim 4 wherein said conductive film comprises Indium thin oxide.

6. The method of claim 5 wherein during said step g. said panel is heated to a temperature of approximately 580° C. for about 10 minutes.

* * * * *